United States Patent [19]
Dannhorn et al.

[11] Patent Number: 5,684,081
[45] Date of Patent: Nov. 4, 1997

[54] RADIATION-CURABLE, AQUEOUS DISPERSIONS, PRODUCTION AND USE THEREOF

[75] Inventors: Wolfgang Dannhorn, Walsrode; Reinhold Hecht, Fallingbostel; Lutz Hoppe, Walsrode; Erhard Lühmann, Bomlitz, all of Germany

[73] Assignee: Wolff Walsrode AG, Walsrode, Germany

[21] Appl. No.: 677,289

[22] Filed: Jul. 9, 1996

[30] Foreign Application Priority Data

Jul. 13, 1995 [DE] Germany .................. 195 25 489.8

[51] Int. Cl.$^6$ .................. C08J 3/00; C08K 3/20; C08L 75/00; C08F 8/30
[52] U.S. Cl. .................. 524/507; 524/539; 524/547; 524/590; 524/591; 525/123; 525/131; 525/455
[58] Field of Search .................. 525/123, 455, 525/131; 524/590, 591, 507, 539, 547

[56] References Cited

U.S. PATENT DOCUMENTS 4,608,400  8/1986  Yokoshima et al. .................. 525/455
5,362,773  11/1994  Brindoepke et al. .................. 523/415

FOREIGN PATENT DOCUMENTS 0554784  8/1993  European Pat. Off. .
0584734  3/1994  European Pat. Off. .
3437918  4/1986  Germany .

*Primary Examiner*—Patrick Niland
*Attorney, Agent, or Firm*—Sprung Kramer Schaefer & Briscoe

[57] ABSTRACT

The present invention relates to polyester acrylate/urethane dispersions based on polyester acrylate prepolymers containing hydroxyl groups, obtainable by polyaddition of A. 40–90 wt. % of one or more polyester acrylate prepolymers containing hydroxyl groups and having an OH content of 40–120 mg of KOH/g and B. 0.1–20 wt. % of one or more mono- and/or difunctional compounds reactive towards isocyanate groups, which compounds contain groups which are cationic, artionic and/or have a dispersant action due to ether groups with C. 10–50 wt. % of one or more polyisocyanates D. 0.0–30 wt. % of polyols together with a subsequent reaction with E. 0.1–10 wt. % of one or more di- and/or polyamines.

3 Claims, No Drawings

RADIATION-CURABLE, AQUEOUS DISPERSIONS, PRODUCTION AND USE THEREOF

The production of aqueous polyurethane dispersions is prior art and is described, for example, in EP-75 775, DE-OS 34 17 265, DE-OS 35 16 806, DE-OS 36 13 492, DE-OS 36 03 996, US-49 92 507, CA-12 24 586, *Methoden der Organischen Chemie, Houben-Weyl,* 4th edition, volume E20/part 2, page 1662, Georg Thieme Verlag, Stuttgart, 1987 and in *Angewandte Chemie,* D. Dieterich, 82, 53 (1970). Polyurethane lacquer coatings having excellent properties, such as chemical resistance and mechanical stability, are obtained if, once the water has evaporated, the coatings are additionally reacted or crosslinked at relatively elevated temperatures. This operation is described as stoving. Under these conditions, for example, ionically modified urethane prepolymers, which still contain a proportion of capped isocyanate groups, react with themselves. Another method consists in adding aminoplastic resins to the polyurethane dispersions, final crosslinking also being performed with these aminoplastic resins at relatively elevated temperatures. Curing at relatively elevated temperatures is suitable where the substrate is resistant to elevated temperatures. This method is not suitable, or only to a limited extent, for coating wood, paper or leather.

Radiation-curable polyurethane dispersions are in particular suitable for protecting these last stated substrates from external influences. EP-554 784 and DE-34 37 918 describe the production of radiation-curable polyurethane dispersions based on acryloyl or methacryloyl groups. However, once the water has evaporated, coatings are obtained which cannot be exposed to mechanical loading or which yield surfaces until they have been radiation cured.

Such binder dispersions cannot be used or may only be used to a limited extent for coating chairs because under conditions radiation curing does not bring about complete curing in those areas shaded from the radiation, in particular beneath the seat base. These areas remain tacky, which is disadvantageous. It is furthermore very difficult to repair coatings obtained with such dispersions. The surfaces are tacky and thus cannot be sanded. As the lacquer coating specialist will know, the adhesion of the new coating after curing will then be inadequate.

Dispersions yielding tack-free surfaces which may be exposed to mechanical loading once the water has evaporated are thus desirable. The uncured lacquer surfaces are moreover also rendered less sensitive to dust.

Physically partially drying, radiation-curable polyurethane acrylate dispersions are described in EP-209 684. However, the surfaces obtained with these dispersions once the water has evaporated do not have sufficient resistance to mechanical loading, such as for example to sanding, in order to satisfy the requirements desired by the person skilled in the art.

The object of the invention was to provide aqueous polyurethane dispersions which, once the water has evaporated, yield tack-free, sandable coatings, which then cure by free radical means or radiation to yield scratch resistant, chemical resistant coatings and do not have the above-stated disadvantages.

This object could surprisingly be achieved by using polyester acrylate prepolymers containing hydroxyl groups, instead of the low molecular weight hydroxyalkyl (meth) acrylates described in the above-stated patents, to synthesise the polyester acrylate/urethane dispersions according to the invention.

Thanks to the use of prepolymers, this synthetic pathway is also economically advantageous because the use of polyester acrylate prepolymers containing hydroxyl means that molecules already having a relatively high molecular weight are used to synthesise the macromolecules and that consequently the isocyanate content may be considerably reduced in comparison with radiation curable polyurethane dispersions produced using conventional methods. As is known, isocyanates are relatively costly starting compounds.

The present invention provides polyester acrylate/urethane dispersions based on polyester acrylate prepolymers containing hydroxyl groups. The polyester acrylate/urethane dispersions according to the invention are produced by polyaddition of A. 40–90 wt. %, preferably 50–80 wt. %, of one or more polyester acrylate prepolymers containing hydroxyl groups and having an OH content of 40–120 mg of KOH/g and B. 0.1–20 wt. %, preferably 2–15 wt. %, of one or more mono- and/or difunctional compounds reactive towards isocyanate groups, which compounds contain groups which are cationic, anionic and/or have a dispersant action due to ether groups with C. 10–50 wt. %, preferably 15–40 wt. % of one or more polyisocyanates D. 0.0–30 wt. %, perferably 0.0–20 wt. % of a polyol together with a subsequent reaction with E. 0.1–10 wt. %, preferably 0.5–7 wt. %, of one or more di- and/or polyamines.

The present invention also provides the use of the polyester acrylate/urethane dispersions according to the invention as lacquer binders.

The polyester acrylate prepolymers A are polycondensation products derived from polycarboxylic or if available the anhydrides thereof (adipic acid sebacic acid maleic anhydride, fumaric acid and phthalic acid may be cited by way of example), di- and/or more highly functional polyols (such as for example ethylene glycol, propylene glycol, neopentyl glycol, trimethylolpropane, pentaerythrite, alkoxylated di- or polyols etc.) and acrylic and/or methacrylic acid.

After polycondensation, excess carboxyl groups may be reacted with epoxides.

Production of the polyester acrylate prepolymers A containing hydroxyl groups is described in U.S.-PS-42 06 205, DE-OS-40 40 290, DE-OS-33 16 592, DE-OS-37 04 098 and *UV & EB Curing Formulations for Printing Inks, Coatings & Paints,* ed. R. Holman and P. Oldring, published by SITA Technology, London (England), 1988, pages 36 et seq.. The reactions should be terminated once the OH value is within the range from 40–120 mg of KOH/g. Alternatively, it is also possible to use polyepoxy acrylate prepolymers containing hydroxyl groups or polyurethane acrylate prepolymers containing hydroxyl groups.

Compounds B which have a dispersant action effected cationically, anionically and/or by ether groups are those containing, for example, sulphonium, ammonium, carboxylate, sulphonate and/or polyether groups and are incorporated into the macromolecule by the presence of isocyanate-reactive groups. Preferred suitable isocyanate-reactive groups are hydroxyl and amine groups. Representatives of compounds B are bis(hydroxymethyl)propionic acid, malic acid, glycolic acid, lactic acid, glycine, alanine, taurine, 2-aminoethylaminoethanesulphonic acid, polyethylene glycols and polypropylene glycols started on alcohols. Bis(hydroxymethyl) propionic acid and polyethylene glycol 750 monomethyl ether are particularly suitable.

Polyaddition may proceed with aromatic, araliphatic, aliphatic or cycloaliphatic polyisocyanates C. Mixtures of such polyisocyanates C may also be used. Examples of suitable polyisocyanates C are tetramethylene diisocyanate, hexamethylene diisocyanate, 2,3,3-trimethylhexamethylene diisocyanate, 1,4-cyclohexylene diisocyanate, 4,4-dicyclohexylmethane diisocyanate, isophorone diisocyanate, 1,4-phenylene diisocyanate, 2,6-tolylene diisocyanate, 1,5-naphthylene diisocyanate, 2,4- or 4,4'-diphenylmethane diisocyanate, triphenylmethane 4,4',4"-triisocyanate, together with polyisocyanates produced by the trimerisation or oligomerisation of diisocyanates or by the reaction of diisocyanates with polyfunctional compounds containing hydroxyl or amine groups. Such compounds include the isocyanurate of hexamethylene diisocyanate. Further suitable compounds are blocked, reversibly capped polykisisocyanates, such as 1,3,5-tris-[6-(1-methylpropylidene aminoxy carbonylamino)hexyl]-2,4,6-trioxo-hexahydro-1,3,5-triazine. Hexamethylene diisocyanate and isophorone diisocyanate and the mixtures thereof are particularly preferred.

As polyols D it is possible to use substances with a molecular weight up to 5000. Such polyols are e.g. propylene glycol, ethylene glycol, neopentyl glycol, 1,6-hexane diol. Examples for higher molecular weight polyols are the well known polyesterpolyols, polyetherpolyols and polycarbonatepolyols which should have an average OH-functionality of 1.8–2,2. If appropriate it is also possible to use monofunctional alcohols such as ethanol and butanol.

Di- and/or polyamines E are used to increase molecular weight. Since this reaction proceeds in the aqueous medium, the di- and/or polyamines E must be more reactive towards the isocyanate groups than is water. Compounds which may be cited by way of example are ethylenediamine, 1,6-hexamethylenediamine, isophoronediamine, 1,3- and 1,4-phenylenediamine, 4,4'-diphenylmethanediamine, aminofunctional polyethylene oxide resp. polypropylene oxide (known as Jeffamin®, D-series), triethylenetetramine and hydrazine. Ethylenediamine is particularly preferred.

It is also possible to add certain proportions of monoamines, and as for example butylamine, ethylamine and amines of the Jeffamin®M series-aminofunctional polyethylene oxides and polypropylene oxides.

The polyester acrylate/urethane dispersions according to the invention may be produced using any known prior art methods, such as emulsifier/shear force, acetone, prepolymer mixing, melt/emulsification, ketimine and solid spontaneous dispersion methods or derivatives thereof (c.f. *Methoden der Organischen Chemie*, Houben-Weyl, 4th edition, volume E20/part 2, page 1682, Georg Thieme Verlag, Stuttgart, 1987). Experience has shown that the acetone method is the most suitable.

Components A, B and D are initially introduced into the reactor in order to produce the intermediates (polyester acrylate/urethane solutions), diluted with a solvent which is miscible with water but inert towards isocyanate groups and heated to relatively elevated temperatures, in particular in the range from 50° to 120° C. Suitable solvents are acetone, butanone, tetrahydrofuran, dioxane, acetonitrile and 1-methyl-2-pyrrolidone. Catalysts known to accelerate the isocyanate addition reaction may also be initially introduced, for example triethylamine, 1,4-diazabicyclo[2, 2,2]octane, tin dioctoate or dibutyltin dilaurate. The polyisocyanate and/or polyisocyanates C are added to these mixtures. The ratio of moles of all hydroxyl groups to moles of all isocyanate groups is generally between 0.3 and 0.95, in particular between 0.4 and 0.9.

Once the polyester acrylate/urethane solutions have been produced from A, B, C and D, the compound B centres having an anionic or cationic dispersant action undergo salt formation, unless this has already occurred in the starting molecules. In the case of anionic centres, bases such as ammonia, triethylamine, triethanolamine, potassium hydroxide or sodium carbonate may advantageously be used, while in the case of cationic centres, sulphuric acid dimethyl ester or succinic acid may advantageously be used. If compounds B having ether groups are used, the neutralisation stage is omitted.

In the final reaction stage, in which an increase in molecular weight and the formation of the polyester acrylate/urethane dispersions occur in the aqueous medium, the polyester urethane solutions prepared from A, B, C and D are either vigorously stirred into the dispersion water containing the polyamine and/or polyamines E or, conversely, the dispersion water/polyamine E mixture is stirred into the polyester urethane solutions prepared from A, B, C and D. Molecular weight is then increased by the reaction of the isocyanate groups still present in the reaction products prepared from A, B, C and D with the amine hydrogens. The dispersions according to the invention are also formed. The quantity of polyamine E used is dependent upon the unreacted isocyanate groups which are still present.

If desired, the solvent may be removed by distillation. The dispersions then have a solids content of 20–60 wt. %, in particular of 30–55 wt. %.

External emulsifiers can additionally be added to stabilise the dispersions.

Once the water has evaporated, the polyester acrylate/urethane dispersions according to the invention yield, even without the addition of auxiliary substances, physically drying coatings which may be exposed to elevated mechanical loads. In particular, the coatings are distinguished by their sandability. When subsequently crosslinked by radiation and/or free radical means, the films cure to yield particularly high quality, scratch resistant and chemical resistant lacquer coatings.

In the case of radiation-induced polymerisation (UV, electron, X-ray or gamma radiation), UV curing is particularly preferred. UV curing is initiated in the presence of photoinitiators. Suitable photoinitiators are, for example, aromatic ketone compounds, such as benzophenones, alkylbenzophenones, Michler's ketone, anthrone and halogenated benzophenones. Further suitable compounds are, for example, 2,4,6-trimethylbenzoyldiphenylphosphine oxide, phenylglyoxylic acid esters, anthraquinone and the derivatives thereof, benzil ketals and hydroxyalkylphenones. Mixtures of these compounds may also be used.

If curing proceeds by free radical means, water-soluble peroxides or aqueous emulsions of non water soluble initiators are suitable. These free radical formers may be combined with accelerators in a manner known per The polyester acrylate/urethane dispersions according to the invention may be applied onto the most varied substrates by spraying, rolling, knife-coating, pouring, brushing or dipping. If the polyester acrylate/urethane dispersions according to the invention are applied onto wood, the resultant surfaces are distinguished by particularly good optical properties. Other absorbent substrates such as paper, paperboard, leather and the like, as well as metals and plastics may also be coated with these dispersions.

The polyester acrylate/urethane dispersions according to the invention may be used as the sole lacquer binder or they may be mixed or combined with binders, auxiliary substances and additives known in lacquer technology, such as for example dispersions, pigments, dyes or flatting agents.

EXAMPLES

The following examples are intended to illustrate the invention without restricting its scope.

The polyester acrylate prepolymers A are produced and used as follows.

Production of polyester acrylate prepolymer A1 containing hydroxyl groups according to Example 2 of DE-OS 40 40 290

193 g of phthalic anhydride, 190 g of adipic acid, 62 g of ethylene glycol and 37 g of toluene are reacted for 1 hour at 175° C. in a multiple-necked flask with water separator. 220 g of 1,6-hexanediol, 268 g of trimethylolpropane, 375 g of acrylic acid, 483 g of toluene, 10.4 g of p-toluenesulphonic acid monohydrate and 5.2 g of hydroquinone are then added at 100° C. and refluxed for 8 hours. The solvent is removed by distillation under a water-jet vacuum. 48.3 g of Epikote 828 (epoxy resin from Shell) and 1.5 g of triphenylphosphine are added to 500 g of the resultant residue and stirred for 5 hours at 120° C. The OH value is 81 mg of KOH/g and the viscosity 19.8 Pa⁻s.

Polyester acrylate prepolymer A2 containing hydroxyl groups

Laromer LR 8800 (registered trade name of BASF), OH value 80 mg of KOH/g.

Viscosity 9.7 Pa⁻s.

Polyester acrylate prepolymer A3 containing hydroxyl groups

Laromer LR 8799 (registered trade name of BASF), OH value 82 mg of KOH/g.

Viscosity 4.1 Pa⁻s.

Production of polyester acrylate/urethane dispersions according to the invention

Example 1

A mixture of 24 g of hexamethylene diisocyanate and 31.7 g of isophorone diisocyanate are added to a refluxing mixture of 150 g of polyester acrylate prepolymer A1, 15 g of bis-(hydroxymethyl)propionic acid, 0.22 g of dibutyltin dilaurate and 129 g of acetone and stirred for 4 hours. 11.2 g of triethylamine are then added at 40° C. After cooling to room temperature, the polyester acrylate/urethane solution is vigorously stirred into 515 g of water which contains 3.6 g of ethylenediamine. A dispersion is then spontaneously formed. Stirring is continued until no isocyanate may any longer be detected by IR spectroscopy at a wave number of 2270. The solvent is stripped out under a vacuum in a rotary evaporator. Solids content: 39.1%; pH: 7.1; viscosity DIN 4 (20° C.): 89 seconds; MFT: <12° C.

Example 2

Repetition of Example 1, with the difference that 150 g of polyester acrylate prepolymer A2 are used in the production of the polyester acrylate/urethane solution. 11.2 g of triethylamine are then added at 40° C. After cooling to room temperature, the polyester acrylate/urethane solution is stirred with vigorous shearing into a mixture of 515 g of water and 3.6 g of ethylenediamine, wherein a dispersion is spontaneously formed. Once the isocyanate groups have completely reacted, the solvent is removed by vacuum distillation. Solids content: 41.1 %; pH: 7.2; viscosity DIN 4 (20° C.): 27 seconds; MFT: <12° C.

Example 3

Repetition of Example 1, with the difference that 150 g of polyester acrylate prepolymer A3 are used in the production of the polyester acrylate/urethane solution. Neutralisation is then performed at 40° C. with 11.2 g of triethylamine. At room temperature, the polyester acrylate/urethane solution is stirred with vigorous shearing into a mixture of 515 g of water and 3.6 g of ethylenediamine, a dispersion spontaneously being formed. Once the isocyanate groups have completely reacted, the solvent is removed by vacuum distillation. Solids content: 40.2%; pH: 7.2; viscosity DIN 4 (20° C.): 27 seconds; MFT: <12° C.

Example 4

50 g of isophorone diisocyanate are added dropwise to a refluxing mixture of 150 g of polyester acrylate prepolymer A3, 7.5 g of bis-(hydroxymethyl)propionic acid, 0.2 g of dibutyltin dilaurate and 118 g of acetone, and stirred for 4 hours. 5.6 g of triethylamine are then added at 40° C. After cooling to room temperature, the polyester acrylate/urethane solution is vigorously stirred into 470 g of water which contains 3.6 g of ethylenediamine. A dispersion is then spontaneously formed. Stirring is continued until no isocyanate may any longer be detected by IR spectroscopy at a wave number of 2270. The solvent is stripped out under a vacuum in a rotary evaporator. Solids content: 37.4%; pH: 7.1; viscosity DIN 4:73 seconds; MFT: <12° C.

Example 5

90 g of IPDI are added dropwise to a refluxing mixture of 100 g of polyester acrylate prepolymer A3, 3 g of bis-(hydroxymethyl)propionic acid, 60 g of polyethylene glycol 750 monomethyl ether, 0.2 g of dibutyltin dilaurate and 96 g of acetone and stirred for 4 hours. After cooling, 2.26 g of triethylamine are added. The polyester urethane solution is dispersed with vigorous stirring in 315 g of water which contains 2.4 g of ethylenediamine. The dispersion is stirred until it contains no isocyanate. The solvent is stripped out under a vacuum in a rotary evaporator. The resultant dispersion is stable even at a pH value of 1. Solids content: 40%; pH: 7.1; viscosity DIN 4: 17 seconds; MFT: >12° C.

Example 6

A mixture of 39 g of isophorone diisocyanate and 15 g of hexamethylene diisocyanate was added to 150 g of polyester acrylate A 3, 7.6 g of bis-(hydroxymethyl)-propionic acid, 1.4 g of neopentyl glycol, 0.2 g of dibutyltin dilaurate and 53 g of acetone. The solution is refluxed for 5 hours with stirring. After cooling the mixture, 5.7 g of triethylamine are added. Then the polyester urethane solution is dispersed with vigorous stirring into 416 g of water containing 5.1 g of ethylene diamine. The mixture is stirred until it is no longer possible to detect an isocyanate band at a wavelength of 2,270 cm$^{-1}$ by IR spectroscopy. The solvent is stripped off in vacuo. Solids content: 40.1%; pH: 7.9; viscosity DIN-4: 15 s, MFT: <12° C.

Example 7

A mixture of 35 g of polyester acrylate prepolymer A3, 50 g of Ebecryl 600 (registered trade name of UCB), 25.5 g of Poly-THF 1000, 7 g of bis-(hydroxymethyl)propionic acid, 75.5 g of 4,4'-dicyclohexylmethane diisocyanate, 0.19 g of dibutyltin dilaurate and 83 g of acetone was heated to reflux and stirred for 4 hours. 5.3 g of triethylamine are then added seconds and sprayed at a rate of 80 g/m$^2$ onto ash wood. Once the water had evaporated at 25° C., the coating was cured with UV light (80 W/cm, 1 m/min and lamp) and the surfaces sanded. The same formulations were once more sprayed onto these surfaces (film thickness: approximately 80 g/m$^2$), dried at 25° C. and cured with UV light (80 W/cm, 1 m/min and lamp). The Table shows behaviour on the wood surface (build), pore wetting and levelling. Surface resistance to DIN 68 861 - 1B was also determined on these surfaces (the Table contains the test results for water, 48% ethanol, 10% aqueous ammonia solution, dibutyl phthalate and acetone).

TABLE

|  | Example 1 | Example 2 | Example 3 | Example 4 | Example 5 | Example 6 | Example 7 |
|---|---|---|---|---|---|---|---|
| Pendulum hardness after elimination of water (DIN 53157) | 38 seconds | 21 seconds | 15 seconds | 34 seconds | 17 seconds | 25 seconds | 134 seconds |
| Pendulum hardness after UV curing (DIN 53157) | 170 seconds | 174 seconds | 153 seconds | 163 seconds | 147 seconds | 168 seconds | 185 seconds |
| Chemical resistance* (DIN 68861 - 1B) after UV curing to: | | | | | | | |
| water | 0 | 0 | 0 | 0 | 0 | 0 | 0 |
| ethanol | 0 | 0 | 0 | 0 | 1 | 0 | 0 |
| aqueous ammonia solution | 0 | 0 | 0 | 0 | 0 | 0–1 | 0 |
| dibutyl phthalate | 0 | 0 | 0 | 0 | 0 | 0 | 0 |
| acetone | 0 | 0–1 | 1 | 0 | 0–1 | 0 | 0 |
| Sandability after elimination of water** (P360 grain) | 1 | 1 | 1 | 1 | 2 | 1 | 1 |

Appearance of surface on ash wood
The lacquer coatings exhibit excellent levelling with very good build. Adhesion and hardness are excellent.
*Resistance: 0 = maximum value
          1 = pass
          2 = fail
**Rating: 1 = very good, fine abraded dust, no clogging of sandpaper.
          2 = good, fine abraded dust, slight clogging of sandpaper.
          3 = unsatisfactory, abraded dust clumps together, severe clogging of sandpaper.
          4 = poor, sticks at 40 ° C. After cooling to room temperature, the solution is vigorously stirred into 376 g of water which contains 4.1 g of ethylene diamine. A dispersion is then spontaneously formed. Once the isocyanate groups have completely reacted, the solvent is removed by vacuum distillation. Solids content: 40.1%; pH: 8.0; viscosity DIN 4 (20° C.): 20 seconds.

Practical testing of polyester acrylate/urethane dispersions according to the invention (c.f. also Table)

The dispersions were applied onto glass sheets to a film thickness of 90 μm, dried at 25° C. and, after 1 hour, the König pendulum hardness (DIN 53 157) determined. Dispersions to which had been added 1.5 wt. % of the photoinitiator 2-hydroxy-2-methyl-1-phenyl-1-propanone (Darocur 1173, Ciba-Geigy) were applied onto glass in an identical manner, dried (25° C.) and exposed to UV light (80 W/cm, 10 m/min and lamp). König pendulum hardness (DIN 53 157) was determined 30 minutes after UV curing.

In order to determine surface optical properties, 154 g portions of the dispersion were each mixed with 2 g of flatting agent TS 100 (Degussa), 2.6 g of photoinitiator mixture (2-hydroxy-2-methyl-1-phenyl-1-propanone (Darocur 1173, Ciba-Geigy)/benzophenone 2:1) and 1.5 g of Schwego PUR 8050 (Schwegmann). The formulations were adjusted with water to a DIN 4 cup draining time of 35–40

We claim:
1. Polyester acrylate/urethane dispersions based on polyester acrylate prepolymers containing hydroxyl groups, obtainable by polyaddition of

A. 40–90 wt. % of one or more polyester acrylate prepolymers containing hydroxyl groups and having an OH content of 40–120 mg of KOH/g and B. 0.1–20 wt. % of one or more mono- and/or difunctional compounds reactive towards isocyanate groups, which compounds contain groups which are cationic, anionic and/or have a dispersant action due to ether groups with C. 10–50 wt. % of one or more polyisocyanates D. 0.0–30.0 Wt. % of polyols together with a subsequent reaction with E. 0.1–10 wt. % of one or more di- and/or polyamines.

2. Dispersions according to claim 1, characterised in that

A amounts to 50 to 80 wt. %,

B amounts to 2 to 15 wt. %,

C amounts to 15 to 40 wt. % and

D amounts to 0.0 to 20 wt. % and

E amounts to 0.5 to 7 wt. %.

3. In a lacquer including a lacquer binder, the improvement wherein said binder comprises a dispersion according to claim 1.

* * * * *

UNITED STATES PATENT AND TRADEMARK OFFICE
CERTIFICATE OF CORRECTION

PATENT NO. : 5,684,081
DATED : November 4, 1997
INVENTOR(S) : Dannhorn, et al.

It is certified that error appears in the above-indentified patent and that said Letters Patent is hereby corrected as shown below:

Title Page  [57] ABSTRACT: Line 9 delete " artionic " and substitute -- anionic --

Col. 8, line 43  Delete " obtainable " and substitute -- obtained

Signed and Sealed this

Twenty-first Day of July, 1998

Attest:

BRUCE LEHMAN

Attesting Officer

Commissioner of Patents and Trademarks